(12) United States Patent
Labrot et al.

(10) Patent No.: US 8,427,381 B2
(45) Date of Patent: Apr. 23, 2013

(54) LAMINATED GLASS COMPRISING A FIXATION DEVICE INTRODUCED IN A PORTHOLE FOR OBJECTS

(75) Inventors: Michael Labrot, Aachen (DE); Stefan Ziegler, Aachen (DE); Lothar Schmidt, Aachen (DE); Martin Melcher, Herzogenrath (DE)

(73) Assignee: Saint-Gobain Glass France, Courbevoie (FR)

( * ) Notice: Subject to any disclaimer, the term of this patent is extended or adjusted under 35 U.S.C. 154(b) by 945 days.

(21) Appl. No.: 12/516,730

(22) PCT Filed: Nov. 29, 2007

(86) PCT No.: PCT/FR2007/052418
§ 371 (c)(1),
(2), (4) Date: Jul. 21, 2009

(87) PCT Pub. No.: WO2008/065310
PCT Pub. Date: Jun. 5, 2008

(65) Prior Publication Data
US 2010/0059253 A1 Mar. 11, 2010

(30) Foreign Application Priority Data
Nov. 30, 2006 (DE) .......................... 10 2006 056 501

(51) Int. Cl.
*E06B 3/24* (2006.01)
*B32B 3/10* (2006.01)

(52) U.S. Cl.
USPC .......... 343/713; 343/711; 343/712; 52/204.5; 361/748

(58) Field of Classification Search .................. 428/131, 428/137; 343/711–713; 174/251; 361/748; 52/204.5, 786.13, 786.1
See application file for complete search history.

(56) References Cited

U.S. PATENT DOCUMENTS 4,124,367 A * 11/1978 Reese et al. ..................... 65/104
(Continued)

FOREIGN PATENT DOCUMENTS

DE          43 11 442 C1      7/1994
DE     20 2005 003 549 U1      6/2005
(Continued)

OTHER PUBLICATIONS

U.S. Appl. No. 13/254,084, filed Aug. 31, 2011, Olivier, et al.

*Primary Examiner* — Angel R Estrada
*Assistant Examiner* — Dimary Lopez
(74) *Attorney, Agent, or Firm* — Oblon, Spivak, McClelland, Maier & Neustadt, L.L.P.

(57) ABSTRACT

In a laminated glass sheet with a fixing device introduced into a through-hole for objects, particularly for antennas, the through-hole is made up of holes of different sizes in two rigid sheets of the lamination, and the fixing device includes at least two parts introduced into the through-hole, pressing against surfaces around the edge of the through-hole, which surfaces are situated one facing the other. The two parts of the fixing device press from both sides against the surfaces around the edge surrounding the smaller hole made in the sheet, in that region of the walls of a smaller hole that exhibits an edge compression stress that is increased by heat treatment by comparison with the remainder of the surface of the sheet.

18 Claims, 1 Drawing Sheet

U.S. PATENT DOCUMENTS

| | | | | |
|---|---|---|---|---|
| 4,306,241 A | * | 12/1981 | Sono | 343/713 |
| 6,138,434 A | * | 10/2000 | Demars et al. | 52/786.13 |
| 6,976,727 B2 | * | 12/2005 | Omori | 296/146.16 |
| 2001/0023562 A1 | * | 9/2001 | Blobaum et al. | 52/235 |
| 2002/0112425 A1 | * | 8/2002 | Wildenhain et al. | 52/235 |
| 2006/0101737 A1 | * | 5/2006 | Platz | 52/204.5 |

FOREIGN PATENT DOCUMENTS

| | | |
|---|---|---|
| ES | 2209568 A1 * | 6/2004 |
| FR | 2 662 398 A1 | 11/1991 |
| FR | 2 732 730 A1 | 10/1996 |
| JP | 2004-166202 | 6/2004 |
| WO | WO 2004/086556 A1 | 10/2004 |

* cited by examiner

LAMINATED GLASS COMPRISING A FIXATION DEVICE INTRODUCED IN A PORTHOLE FOR OBJECTS

TECHNICAL FIELD

The present invention relates to a laminated glass sheet with a fixing device inserted into a through-hole for objects. Particular attention is drawn to the fixing of an antenna into a through-hole situated in a motor vehicle window or sunroof.

BACKGROUND

Numerous embodiments of in-glass antennas in a monolithic or laminated embodiment are known, in which embodiments antenna structures are placed directly on the glazed surface or within the lamination of the sheets. The present invention, however, by way of preferred application, relates to antennas to be mounted separately on the glass sheet.

Nonetheless, it must be understood that the present invention can be used not only on motor vehicle laminated glass sheets but also on the glass sheets used in buildings. It is not a matter of fixing the glass sheet itself onto a structure but of using the glass sheet, itself equipped with a through-hole, as a support for an object fixed to it.

It is also known practice for objects such as rear-view mirrors, for example (DE 35 09 531 C1), antennas and/or sensors to be fixed to glass sheets by bonding them onto one of the main surfaces thereof, without there being a need for any orifice in order to do so.

Document DE 30 20 253 A1 describes a fixing of an antenna (not of this kind) into a motor vehicle monolithic windshield. This windshield has a hole into which an antenna holder element is introduced removably. The holder element has a stem part that fits into the hole and a neck, which is larger than the diameter of the hole. This neck presses against one of the faces on the surface of the windshield via an intermediate layer that acts as a seal. The holder element is fixed by a screw screwed from the other side of the windshield into the stem part thereof via a back support piece, the back support part also pressing via an intermediate layer that acts as a seal against the opposite surface face of the windshield to the holder element. It at the same time acts as a base for an interior rear-view mirror.

Document DE 10 2004 011 662 A1 discloses a fixing for an antenna on a sunroof of a motor vehicle. The (monolithic) sunroof is provided, at the point where the antenna is mounted, with an orifice into which the antenna is introduced. At the same point, a metal plate with a corresponding orifice on the underside of the sunroof has, however, to be provided out of functional necessity, as this plate has to provide the antenna with a ground potential. The antenna is introduced into the orifices and screwed, a sealing gasket between the antenna body and the glass being positioned on the external glazed surface.

This teaching can be put only to limited use in respect of an antenna actually properly introduced into a glass sheet, and it does not cover laminated glass sheets even though these are normally used on motor vehicle sunroofs and windshields.

Document DE 43 11 442 C1 describes a method for screw-fastening a fixing or retaining element onto a corresponding laminated glass sheet, whereby the retaining element is introduced into an orifice passing through the two sheets of lamination. The known method addresses the problem that the layer between the laminations or layer of adhesive must not be loaded with the pressure involved in the tightening of a screw because it could then ultimately let go. The two sheets are therefore provided with orifices of different sizes, which are positioned eccentrically with respect to one another in the lamination. In order to relieve the load on the adhesive layer of the lamination, the space between the fixing parts introduced into this orifice of a smaller size and the walls of the hole is filled with a thermosetting plastic which is supposed to bear the forces of tensioning of the screw fastening. By virtue of the eccentricity of the two holes, the retaining element is also protected against torsion. According to that publication, the two parts of the fixing device also press against the exterior surfaces of the two rigid sheets of the lamination.

Document DE 44 04 165 C1 describes a method for increasing the compression stresses in the region of an orifice in a monolithic sheet that is prestressed in its entirety, whereby, during the contact prestressing process, a cooling means is also brought into the orifice. In this way, the region of the walls of the hole is prestressed in a targeted fashion using a thermal process.

SUMMARY

It is an objective of the present invention, starting out from the laminated glass sheet known from document DE 43 11 442 C1, to create another laminated glass sheet with a fixing device introduced into a through-hole for objects, whereby any loading of the intermediate layer is avoided.

This objective is achieved according to the present invention through the features discussed herein. The features of the dependent claims indicate advantageous improvements to this invention.

According to the invention, the fixing device is therefore fixed only or substantially on the sheet with the smaller orifice, whereas the second rigid sheet made of glass or of plastic does not have to bear the stress of screw fastening. This then also excludes any excessive loading of the intermediate layer or of the layer of adhesive. Further, following a heat treatment in the region of the surfaces surrounding this smaller hole, there is a compression stress that is higher by comparison with the remainder of the surface of the sheet, which compression stress makes a non-prestressed glass loaded further even stronger here.

Tests have shown that this increased compression stress can be achieved fairly easily and without a great deal of equipment through the fact that, when two sheets are being used for the lamination, these sheets are equipped prior to heat treatment (bending) with holes of different sizes. In laminated glass sheets, this heat treatment (particularly aimed at bending the sheets to a desired shape) is, as a general rule, performed as is known with sheets placed one on top of the other so that their curvature is as uniform as possible and differences in shape, which could at the time of subsequent assembly lead to problems that could extend as far as breakage, are to a large extent eliminated.

During the subsequent cooling of the sheets from their softening temperature, the region around the edge of the smaller orifice that is not covered by the second sheet itself cools a little more quickly than the remainder of this sheet and this then in a simple way yields a higher compression prestress which in this case is also desirable.

Evidently it is also possible in a targeted fashion to give rise to such an increased compression stress in the region of the walls of the smaller hole in a different way, for example in a way similar to the method already mentioned in document DE 44 04 185 C1. Naturally, it is necessary to avoid prestressing the entirety of the sheet when for other reasons that would seem not to be desirable.

During the tests mentioned, typical edge compression stresses of around 20 MPa on the small orifice and around 10 MPa on the large orifice, for example, were found. It was also discovered through simulation that, for a mechanical load, the edge of the small orifice was subjected to greater loading, which is fortuitous in this instance because the edge compression stress here is higher too. At the same time, while there are admittedly compensatory tensile stresses a little further out of the edge of the orifice, those stresses can be controlled. The regions subjected to tensile stress are primarily sensitive to surface damage, although this is not to be expected in this special setup environment.

At least the sheet with the small orifice can be prestressed using a thermal process obviously in a way known per se (toughened glass ESG) or it can be partially prestressed (partially prestressed glass; TVG).

The exterior parts such as the antennas on the glass sheets of motor vehicles are exposed to considerable partial forces (wind). Mechanical loadings also, for example when a whip antenna is removed before going through a car wash (or even when it is not removed before going through the car wash), not to mention vandalism cannot be excluded. It is possible to minimize damage by having a glass sheet of high stability as such in the region of the hole.

In an alternative form of embodiment of the present invention, the fixing device further comprises an additional support piece with which the second rigid sheet too is used to support the fixing device against the forces involved (particularly bending forces). This support piece widens the base against which the fixing device can press when the forces come into action. However, as a preference, it is in its turn mainly restricted to the sheet with the smaller hole, and possibly bonded to the other rigid sheet in the region around the edge of the larger orifice therein.

Finally, there is the advantageous option of providing also on the laminated glass sheet that forms the subject of the present invention, in a similar way to the previously-mentioned in-glass antennas with antenna structures applied by pressure, for an antenna introduced into the through-hole, electric circuits on one of the glazed surfaces, and preferably on the inside of the lamination. These circuits in the form of wire-like conductors or printed or discrete flat cables or even in the form of segments of an electrically conducting coating, extend into the region of the through-hole and as far as the edge of the aforementioned small orifice, where they can come into contact with the antenna using few resources in an electric-galvanic and/or capacitive manner.

Further advantageous details of the subject matter of the invention will become clear from the drawings which show one exemplary embodiment and from the following description.

BRIEF DESCRIPTION OF THE DRAWINGS

A simplified depiction, not drawn to scale, shows.

DETAILED DESCRIPTION

Figure 1:
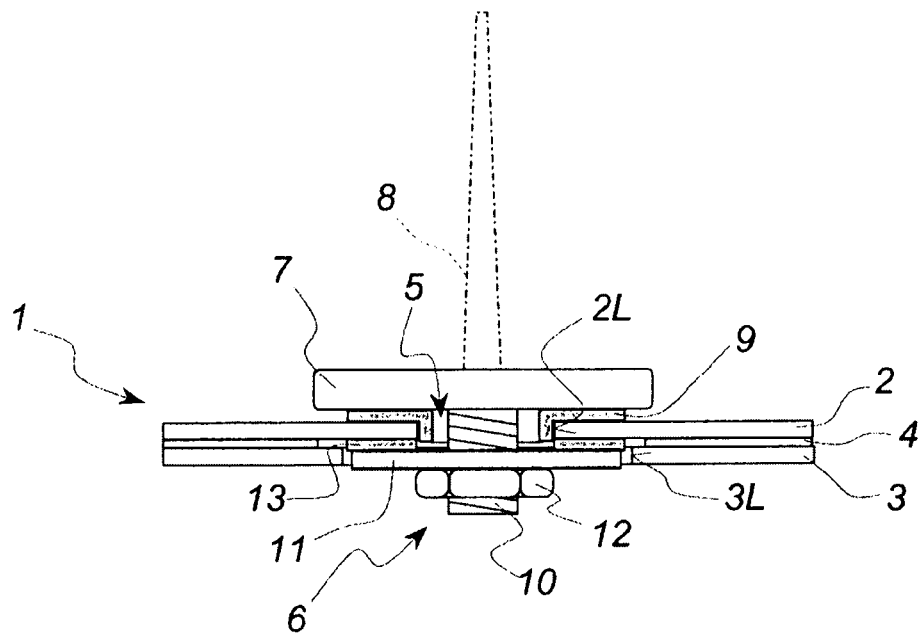
In FIG. 1: a section through a first embodiment of a laminated glass sheet with a through-hole and a fixing device introduced therein, In FIG. 2: a second embodiment, again in cross section, in which the fixing device of FIG. 1 is equipped with an additional support piece for broadening its support base.

According to FIG. 1, a laminated glass sheet 1, shown only in a small cross section, is made up of a sheet 2 and of a second rigid sheet 3 made of glass or of plastic, which are joined together by means of a layer of adhesive 4 which bonds their surfaces together. The sheet 2 has a hole 2L and the second rigid sheet 3 has a hole 3L, the diameter of which is greater than that of the hole 2L.

The following provisions for example may be mentioned. The two sheets 2 and 3 are both made of float glass 2.1 mm thick, it being possible for the two sheets to have different thicknesses from one another, and naturally it also being possible for them to have thickness dimensions other than those mentioned.

The two holes have diameters of, for example, 20 and 40 mm; there would be no problem in deviating from these diameters or in having larger or smaller differences between the diameters, if necessary.

The layer of adhesive 4 (a polyvinylbutyral film) has, in the region of the through-hole, also been provided with a cutout, which is a little larger than the diameter of the larger hole 3L. The two holes 2L and 3L are aligned in such a way that the laminated glass sheet 1 overall has a through-hole 5 into which a fixing device 6 is introduced, the larger hole 3L surrounding the edge of the smaller one at least in such a way that the latter hole is surrounded all around the edge surfaces of the sheet 2. In this context, there is not, however, any precise coaxial orientation nor is there any certain eccentricity between the two holes 2L and 3L.

With the aforementioned relatively large rear cutout in the adhesive film 4 it is contrived for this film not to be compressed during the lamination process in the space inside the through-hole 5.

The fixing device 6 here has a base or plate 7 used, for example, to attach a whip antenna 8, indicated only in dotted line, to the laminated glass sheet 1. In this case, the surface of the sheet 2, situated at the top in the figure, is the exterior surface. The plate 7 lies on top of an intermediate layer 9 acting as a seal (for example made of EPDM or some other soft elastic material that water cannot penetrate) on the exterior surface of the sheet 2 all around the hole 2L with a certain degree of overlap. It has a threaded journal 10 (for example a central one), which is introduced into the through-hole 5. A washer 11 (made of metal or of plastic) is pushed over this threaded journal 10, and this washer is held tight against the sheet 2 by means of a nut 12 screwed onto the threaded journal 10 and also over an intermediate layer 13, from the other face. The threaded journal 10 may be hollow so that an antenna cable (not depicted) can pass through it.

The intermediate layer 9 in this instance is equipped with a neck introduced into the hole 2L, which serves to center the intermediate layer 9 on the hole 2L and also to prevent direct contacts between the glass edge and the threaded journal 10. Obviously, other solutions can equally be used, for example a plastic sleeve surrounding the threaded journal 10 in the hole 2L (and which may at the same time act as a screw tightness limiter) or the like.

It can be seen that the fixing device 6 and/or the plate 7 with the antenna 8 is therefore fixed only to the sheet 2. The layer of adhesive 4 remains completely out of contact with the stressing forces.

It must also be pointed out that, for the purposes of clarity, the dimensions of the various parts of the fixing device have been deliberately exaggerated relative to the thickness of the rigid sheets 2 and 3.

Figure 2:
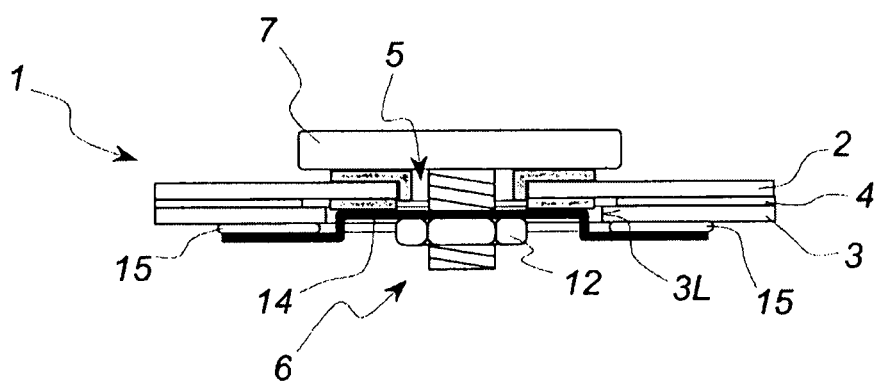

In the alternative form of the fixing device 6, shown in FIG. 2, the washer 11 of FIG. 1 is replaced by a domed washer 14, the outside diameter of which is appreciably larger than that of the larger hole 3L. The outer edge of the washer 14 is domed with respect to its interior region so that it extends right up to the underside of the rigid sheet 3 in the region around the hole 3L, whereas the interior region is in turn clamped by the nut 12 against the sheet 2.

In the region of overlap between the washer 14 and the rigid sheet 3, there is a layer of adhesive 15 which surrounds the hole 3L in a circle. As the fixing device 6 is being mounted in the through-hole, this layer of adhesive 15 is applied only a little before the washer 14 is applied and the nut is tightened against the rigid sheet 3. It deforms and at the same time absorbs the action of the forces of the washer against the second rigid sheet. The stressing process thus takes place before the adhesive, which possibly has lasting elasticity, for example being polyurethane, solidifies. This has the advantage that it is not necessary to wait for this solidification. The layer of adhesive does, however, later constitute a fixed base to bear forces applied to the fixing device 6 (and/or to the antenna 8) against the second rigid sheet, without the need to fear excessive local loading of the layer of adhesive of the lamination 4 or of the edge of the hole 2L.

It is not absolutely essential for the washer 14 to be completely dish shaped; its exterior region could also be reduced to a plurality of protrusions or load spreaders provided that these are esthetically acceptable. The layer of adhesive 15 naturally has to be modified to suit the various points of adhesion.

Nonetheless, the interior part (the part facing toward the cabin of the motor vehicle) of the fixing device will be hidden by a covering. The antenna cable, which must not be overtly accessible, may need to pass through. Alternatives for this will be described later.

If need be, the layer of adhesive 15 may be hidden by means of a layer of opaque color. This layer of color may be applied to any surface of the rigid glass sheet all around the through-hole; however, as a preference, it is anticipated that it will be applied to a surface situated on the inside of the lamination. Better still, it is provided on the same surface of the sheet 2 to which the fixing device is applied on the inside. A layer of color such as this also protects the layer of adhesive against UV radiation and thus against embrittlement.

The figures do not show in detail how an antenna introduced into the through-hole is electrically contacted. It is, however, fitting to print at least one corresponding circuit for the antenna signal, on antennas that are live possibly also other circuits for supplying voltage in a way known per se onto one of the surfaces of the sheets and then for them to be connected up in the region of the through-hole in an appropriate way (for example using short wire bridges, spring contacts, etc.). Such printed circuits will preferably be provided on the surface situated on the inside of the lamination of the sheet 2 with the smaller hole 2L because they will then lie in the same plane as the interior parts of the antenna fixing. Similar circuit designs are known per se for laminated glass sheets that have in-built solar cells.

Instead of a printed circuit, it might, however, be possible also to install an appropriate cable (particularly a flat conductor) within the lamination of the sheets and to make contact with it appropriately. An electrically conducting coating could also be used mainly as such a circuit.

In all the circuit forms mentioned, a purely capacitive coupling known per se between a high frequency antenna signal from the antenna to its conductor, for example through the edge region of the smaller hole 2L in the region where the plate 7 overlaps this edge region, is possible. In that case, the thickness of the sheet 2 could form the dielectric of the capacitive connection.

The invention claimed is:

1. A laminated glass sheet comprising:
    a first rigid sheet and a second rigid sheet, the first and second sheets including glass or plastic;
    a layer of adhesive disposed between the first and second sheets so as to bond together a first surface of the first sheet to a first surface of the second sheet;
    a through-hole including a first hole in the first sheet and a second hole in the second sheet, the first hole being smaller in size than the second hole;
    a fixing device inserted into the through-hole for fixing objects to the laminated glass sheet, the fixing device including a plate and a washer, the plate and the washer disposed so as to press against opposite surfaces of the first sheet around an edge of the first hole,
    wherein a region of walls of the first hole exhibits an edge compression stress that is increased by heat treatment by comparison with a remainder of the first sheet, and
    wherein the layer of adhesive is a film in a region of the through-hole, an inner diameter of the layer of adhesive being larger than a diameter of the second hole, and
    wherein the layer of adhesive does not protrude beyond the diameter of the second hole.

2. The laminated glass sheet as claimed in claim 1, wherein the fixing device further includes a screw-connection passing through the through-hole, the plate being clamped via the screw connection against the first surface of the first sheet.

3. The laminated glass sheet as claimed in claim 1, wherein the washer presses at least indirectly against the edge of the first hole.

4. The laminated glass sheet as claimed in claim 3, wherein the washer is positioned in the second hole without either contacting or overlapping the second sheet.

5. The laminated glass sheet as claimed in claim 3, wherein the washer is domed and larger than the second hole such that an outer radial portion of the washer presses against a second surface of the second sheet, the second surface of the second sheet being opposite the first surface of the second sheet.

6. The laminated glass sheet as claimed in claim 5, further comprising a layer of adhesive between the outer radial portion of the washer and the second sheet.

7. The laminated glass sheet as claimed in claim 1, wherein the edge compression stress in the first sheet in the region of the first hole is higher than edge compression stress in the second sheet, the second sheet including glass.

8. The laminated glass sheet as claimed in claim 7, wherein the edge compression stress around the first hole in the first sheet is approximately twice as high as the edge compression stress around the second hole in the second sheet.

9. The laminated glass sheet as claimed in claim 7, wherein the edge compression stresses are as high as at least 8 MPa for the second hole and at least 15 MPa for the first hole.

10. The laminated glass sheet as claimed in claim 7, wherein the edge compression stresses are as high as about 10 and/or 20 MPa.

11. The laminated glass sheet as claimed in claim 1, wherein the fixing device is fixed to the first sheet by clamping via intermediate soft elastic layers.

12. The laminated glass sheet as claimed in claim 1, further comprising, at least around the through-hole, a layer of opaque color to hide parts of the fixing device.

13. The laminated glass sheet as claimed in claim 1, wherein the fixing device fixes an antenna to the laminated glass sheet.

14. The laminated glass sheet as claimed in claim 13, wherein the antenna protrudes from an outside of the laminated glass sheet when the laminated glass sheet is fitted in position on a vehicle.

15. The laminated glass sheet as claimed in claim 1, further comprising at least one electric circuit for an antenna introduced by the fixing device into the through-hole.

16. The laminated glass sheet as claimed in claim 15, wherein the circuit is located on one surface of the second sheet, situated within the lamination.

17. The laminated glass sheet as claimed in claim 15, wherein the circuit is in a form of wire-like conductors or flat cables incorporated into the laminated glass sheet.

18. The laminated glass sheet as claimed in claim 1, wherein, at least in a region of the through-hole, a coating is mounted on a face of the laminated glass sheet that faces toward a cabin of a motor vehicle.

\* \* \* \* \*